(12) United States Patent
Dolenti et al.

(10) Patent No.: US 8,096,523 B2
(45) Date of Patent: Jan. 17, 2012

(54) NON-CONTACT TORQUE SENSING FOR VALVE ACTUATORS

(75) Inventors: William T. Dolenti, Lynchburg, VA (US); Byron A. Fleury, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 722 days.

(21) Appl. No.: 12/070,184

(22) Filed: Feb. 15, 2008

(65) Prior Publication Data
US 2008/0277609 A1   Nov. 13, 2008

Related U.S. Application Data

(60) Provisional application No. 60/902,029, filed on Feb. 16, 2007.

(51) Int. Cl.
*F16K 31/02* (2006.01)

(52) U.S. Cl. ......... 251/129.04; 251/129.01; 73/862.325

(58) Field of Classification Search ............ 251/129.01, 251/129.04; 73/862.325
See application file for complete search history.

(56) References Cited

U.S. PATENT DOCUMENTS

| | | | |
|---|---|---|---|
| 5,257,535 A | 11/1993 | Evans | |
| 5,453,626 A | 9/1995 | DiSpigna et al. | |
| 5,585,571 A | 12/1996 | Lonsdale et al. | |
| 5,684,596 A | 11/1997 | Eslinger et al. | |
| 5,821,425 A | 10/1998 | Mariani et al. | |
| 5,931,044 A | 8/1999 | Robert | |
| 6,240,789 B1 | 6/2001 | Morlan et al. | |
| 6,345,234 B1 | 2/2002 | Dilger et al. | |
| 6,478,584 B2 | 11/2002 | Vile et al. | |
| 6,532,833 B1* | 3/2003 | Lec | 73/862.338 |
| 6,679,123 B2* | 1/2004 | Lec | 73/769 |
| 6,810,750 B1 | 11/2004 | Kiefer et al. | |
| 6,817,253 B2 | 11/2004 | Gandrud | |
| 6,864,759 B2 | 3/2005 | Lonsdale et al. | |
| 6,988,026 B2 | 1/2006 | Breed et al. | |
| 7,043,999 B2* | 5/2006 | Bernhard et al. | 73/801 |
| 7,216,659 B2* | 5/2007 | Caamano et al. | 137/1 |
| 7,559,529 B2 | 7/2009 | Affaticati et al. | |
| 2003/0000309 A1 | 1/2003 | Lonsdale et al. | |
| 2004/0118929 A1 | 6/2004 | Edmonson et al. | |
| 2005/0028595 A1 | 2/2005 | Pfeifer et al. | |
| 2005/0268729 A1 | 12/2005 | Lohr et al. | |
| 2006/0284583 A1 | 12/2006 | Andrews et al. | |

FOREIGN PATENT DOCUMENTS

| | | |
|---|---|---|
| CN | 1373557 A | 10/2002 |
| EP | 0436312 A2 | 7/1991 |
| EP | 0 656 500 A1 | 6/1995 |
| GB | 2 381 069 A | 4/2003 |
| GB | 2 426 336 A | 11/2006 |
| WO | 2006/065813 A1 | 6/2006 |

OTHER PUBLICATIONS

International Search Report for International Application No. PCT/US2008/002038, mailed Aug. 22, 2008 (3 pages).

(Continued)

*Primary Examiner* — John Fristoe, Jr.
(74) *Attorney, Agent, or Firm* — TraskBritt

(57) ABSTRACT

Non-contact torque, thrust, strain, and other data sensing of a valve actuator or valve is disclosed. A sensor may include a surface acoustic wave device.

12 Claims, 2 Drawing Sheets

OTHER PUBLICATIONS

Written Opinion of the International Searching Authority for International Application No. PCT/US2008/002038, mailed Aug. 22, 2008 (5 pages).

Wolff, U., et al., Radio Accessible SAW Sensors for Non-Contact Measurement of Torque and Temperature, IEEE Ultrasonics Symposium, 1996, pp. 359-362, vol. 1.

Reindl, L., et al., Wireless Remote Identification and Sensing with SAW Devices, Proc. IEEE 1998 MMT/AP International Workshop on Commercial Radio Sensor and Communication Techniques, 1998, pp. 83-96.

* cited by examiner

NON-CONTACT TORQUE SENSING FOR VALVE ACTUATORS

CROSS-REFERENCE TO RELATED APPLICATION

This application is a utility conversion of U.S. Provisional Patent Application Ser. No. 60/902,029 for "NON-CONTACT TORQUE SENSING FOR VALVE ACTUATORS" and claims the benefit of the filing date of Feb. 16, 2007.

FIELD OF THE INVENTION

The present invention relates generally to methods, systems, and devices for torque measurement and, more specifically, for non-contact torque sensing of a valve actuator.

BACKGROUND OF THE INVENTION

Valves include devices for both liquids and gases. Valve actuators for valves are known and may be mechanically operated. For example, the valve actuator may be manually driven, operated by fluid pressure in which the shaft is connected directly or indirectly to a fluid operated piston, or be driven by an electro-hydraulic or electro-fluid means. Conventional valve actuators comprise an electrically driven input shaft, which may be rotatable at relatively high speeds with relatively low torque. The input shaft may, through reducing gears such as a worm gear or a helical screw thread and nut, rotate a relatively high torque, low speed output shaft.

Actuators are often sized such that they can provide more torque than necessary to fully seat a given valve. It may be desirable to determine the torque generated by the output shaft or drive sleeve of a valve actuator. For example, when a valve is fully closed and seated, the torque required to open the valve may be considerably higher. Consistently monitoring the torque may indicate if a valve is wearing out or sticking. Trending patterns in the torque measurements may enable predictive maintenance.

Actuators need to control or limit the amount of torque that can be applied to the load in a manner that is appropriate for various operating modes in a given application. Older mechanical technologies typically operate in either of two modes: active or bypassed. If a torque threshold is exceeded, then the mechanical torque sensor switches the actuator into bypass mode. The torque threshold for switching between modes is fixed by the user at startup and remains fixed until physically changed by the user.

Non-mechanical torque sensors may be used with rotary components; however, the torque sensors would need to be placed on a torsion element in the drive train of the valve actuator. The drive train would be spinning during operation. Therefore, retrieval of the torque information from the spinning sensor would be difficult.

It would be advantageous to develop a technique for measuring the torque generated by a valve actuator without the need to contact a rotating member of the valve actuator.

DETAILED DESCRIPTION OF THE INVENTION

Although the foregoing description contains many specifics, these should not be construed as limiting the scope of the present invention, but merely as providing illustrations of some representative embodiments. Similarly, other embodiments of the invention may be devised that do not depart from the spirit or scope of the present invention. Features from different embodiments may be employed in combination.

One embodiment of the present invention relates to mounting a non-contact sensor, for measuring torque or thrust, on a rotary component of an electric valve actuator.

Figure 1:
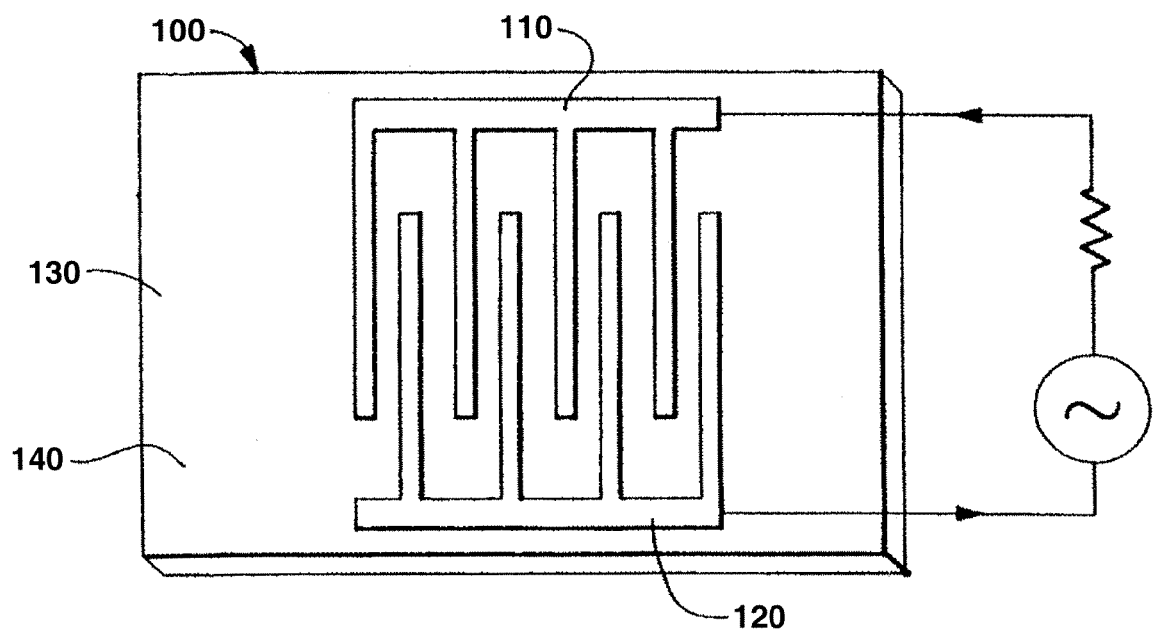
FIG. 1 illustrates one embodiment of a surface acoustic wave that may be used with embodiments of the present invention.

In a particular embodiment, a non-contact sensor includes a surface acoustic wave (SAW) device. A SAW device may be made up of a microstructure deposited on a piezoelectric substrate. The microstructure may be formed by at least one pair of interleaved comb-like electrodes deposited as a thin metal conducting layer on the substrate. FIG. 1 illustrates a basic exemplary model of a SAW device 100 having input electrode 110 interleaved with output electrode 120. The electrodes 110 and 120 (referring to both input electrode 110 and output electrode 120) may include a deposit of aluminum, or other conductors, on upper surface 140 of a piezoelectric substrate 130. In a particular embodiment, the thickness of electrodes 110 and 120 may be on the order of 1000 Angstroms. Many piezoelectric materials are suitable for use as a substrate, including flexible plastic polymers and hard materials, such as ceramic and quartz. Various piezoelectric crystal forms may be used. Non-limiting examples of suitable materials include lithium niobate, lithium tantalate, bismuth germanlure oxide, and gallium oxide.

In SAW device 100, the application of an electric signal to input electrode 110 causes the electrode to act as a transducer converting the electrical input signal into an outgoing acoustic wave on piezoelectric substrate 130. Output electrode 120 reverses the process providing an electrical output signal with the arrival of an acoustic wave on piezoelectric substrate 130.

The operational frequencies of SAW device 100 can be selected anywhere in a wide frequency range extending from a few megahertz up to few gigahertz. The higher the frequency used, the smaller the envelope required for the transducer (electrodes 110 and 120), which may be beneficial where available space is limited. The resonant frequency used depends on a number of factors including the geometry of the electrodes 110 and 120 and the properties of piezoelectric substrate 130. Electrodes 110 and 120 may have any geometry and distance that is necessary between them. The velocity of the surface wave varies with the temperature of piezoelectric substrate 130. The very small sizes in which SAW device 100 can be made facilitate its use as a strain measuring device for a valve actuator.

Coupling between the electrodes 110 and 120 can be accomplished by surface acoustic waves (also known as Rayleigh waves). Another acoustic propagation mode which can be used to couple electrodes 110 and 120 includes surface skimming bulk waves. These extend more deeply into piezoelectric substrate 130 than the surface acoustic waves and, consequently, the surface skimming bulk waves have higher losses than arise with the surface acoustic mode. However, the bulk waves are less sensitive to defects in upper surface 140. The choice of coupling wave may be varied and may depend on the strain measurement to be undertaken.

SAW device 100 may be used in a system where signal inputs to a transducer input (electrode 110) and signal outputs from a transducer (electrode 120) are transmitted by non-contact coupling (such as by inductive, capacitive, or radio wave means) to an external control system. The provision of a non-contact coupling where the electrodes 110 and 120 have no direct electrical connection provides a number of advantages, particularly when there is a need for intrinsic safety or where physical connection would affect the resonance to be measured. Such non-contact systems are particularly convenient for rotating components of a valve actuator. A SAW device 100 may be used in place of a resistive strain gauge. SAW device 100 may be capable of a degree of accuracy substantially greater than that of a conventional resistive strain gauge. Electrodes 110 and 120 may take a number of forms, with size and geometry of electrodes 110 and 120 capable of being modified to affect operating frequency.

SAW device 100 may have a single port, two-ports, or multiple ports. A two-port type has lower losses than a corresponding single port type and may be made to operate in a multi-mode fashion. Additionally, a two-port type may have advantages with regard to phase shift, thereby providing higher operational precision. Additionally, amplifiers may be used to increase the signal generated by output electrode 120.

Torque (radial strain) may be measured by a change in the output frequency of electrode 120 arising from a change in the shape of piezoelectric substrate 130 and, thereby, in the relative positions of the electrodes 110 and 120. The radial strain may be induced by a stress on the member to be measured. The change in the output frequency of electrode 120 is proportional to the applied torque.

SAW device 100 may thus be utilized to measure either torque or axial thrust on rotatable components of a valve actuator. SAW device 100 may be placed on a rotating component at an angle relative to the axis of rotation, such that torque in one direction results in compression and torque in the other direction results in tension. Two SAW devices 100 may be placed at opposing angles to each other (either overlapping or otherwise) such that when one SAW device 100 is experiencing compression the other is experiencing tension, and vice-versa. Alternatively, one SAW device 100 may be provided to measure axial thrust and a second SAW device 100 placed to measure torque. Any number of SAW devices 100 may be used at a given location of a rotating component. Additionally, axial thrust of a rotating component may be used to calculate torque.

SAW device 100 may also be placed on a rotating component such that the device only experiences deformation when the rotating component is bending relative to the axis of rotation. Knowledge of such bending may provide more accurate torque calculations from the strain on other SAW devices on the component. SAW device 100 may also be used for measuring thrust on stationary components of a valve actuator.

Figure 2:
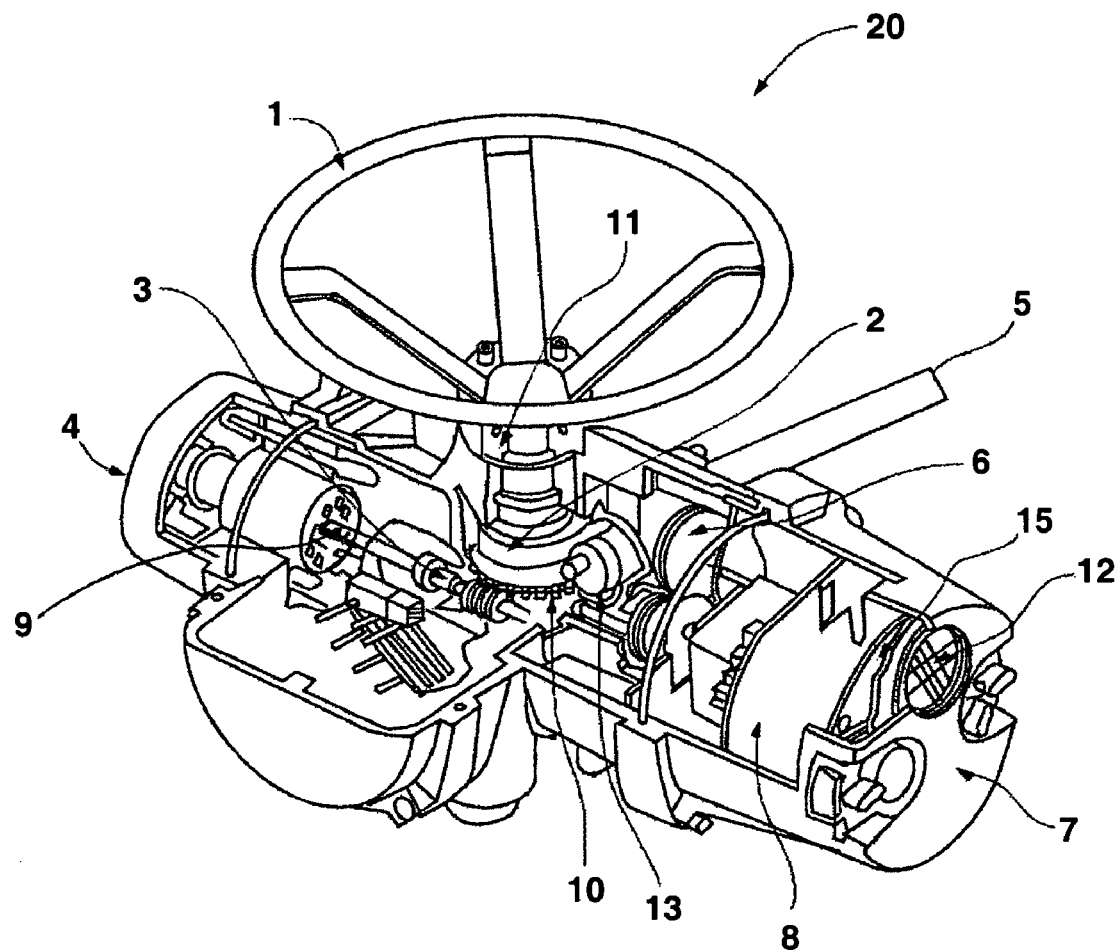
FIG. 2 is a cut-away view of one example of a valve actuator that may utilize embodiments of the present invention.

FIG. 2 depicts some embodiments of possible locations in an electrically driven valve actuator where SAW devices 100 may be mounted. SAW devices 100 may be mounted on worm shaft 3, motor drive shaft 9, drive sleeve 2, and handwheel adapter 11. SAW devices 100 also may be mounted on the teeth of worm gear 10 and worm shaft 3. SAW devices 100 may be mounted on declutch mechanism 13 or declutch handle 5. If an encoder 6 is present, SAW devices 100 may be mounted on an input shaft for the encoder 6. SAW devices 100 may be mounted on stationary components of valve actuator 20, including housing 4.

"Mounted on" as the phrase is used herein encompasses any form of attaching, placing, integrating, embedding, housing, or inserting a SAW device. In one such exemplary embodiment, a SAW device 100 may be placed on a surface of a component. This may be accomplished, for example, via welding or adhesives. In another embodiment, a SAW device 100 may be placed in or integrated with a jacket or sheath and placed on the surface. In a further embodiment, a SAW device may be integrated with another device, and the device mounted upon the surface. In a particular embodiment, SAW devices 100 may be embedded in a component. In yet another embodiment, SAW devices 100 may be fabricated in a component. For example, a piezoelectric material may be integrated into a component when the component is manufactured and conductors for the electrodes later deposited on the piezoelectric material.

SAW devices 100 may be located throughout valve actuator 20. In one embodiment, differences between the torques of various components may be indicative of component wear and provide an early warning of maintenance issues.

Valve actuator 20 is a non-limiting example of a valve actuator that may use SAW devices 100. Valve actuator 20 may be any type of electrically driven valve actuator. For example, valve actuator 20, instead of using a drive sleeve 2, may have an output shaft.

Valve actuator 20 does not need to be electrically driven. Handwheel 1 represents one exemplary embodiment of how valve actuator 20 may be manually operated. Additionally, valve actuator 20 may also be partially pneumatically and/or hydraulically actuated.

SAW devices 100 may also be mounted on the rotatable or stationary components of a valve. In a particular embodiment, SAW devices 100 are mounted on a valve stem. SAW devices 100 may be used to monitor torque experienced by a rotating valve stem or axial thrust experienced by a linear moving valve stem. Any component of a valve, such as the paddle of a butterfly valve, may have SAW devices 100 mounted thereon.

Any necessary electronics may be attached to, or proximally located by, a SAW device 100. Where induction or capacitance are used to power SAW devices 100, the excitement sources may need to be relatively close to SAW devices 100. Wireless exciters may utilize radio frequencies to excite input electrodes 110. Wireless receivers may be designed to receive radio frequency outputs from output electrodes 120. Wireless exciters/receivers may be designed for continuous or intermittent operation. "Wireless exciters/receivers," as the phrase is used herein, encompass both an embodiment where the exciter is separate from the receiver and an embodiment where both functions are accomplished by a single device. Wireless exciters/receivers may be built into or be external to valve actuator 20. In a particular embodiment, wireless exciters/receivers are built into control module 8 or circuit board 15. Where wireless exciters/receivers are built into the valve actuator 20, SAW devices 100 may be activated using control panel 7 or from a remote control station. Torque, thrust, or strain values may be indicated on display 12 and/or transmitted to a remote location.

In other embodiments, a wireless exciter/receiver may be built into a personal digital assistant (PDA), laptop, or other portable device. The appropriate software may be included to compute a torque, thrust, or strain based upon the signal outputted by SAW devices 100. In another embodiment, wireless exciter/receiver nodes may be located in the vicinity of multiple valve actuators and valves. The wireless exciter/receiver nodes could transmit torque and other data for numerous valve actuators and valves to a central control station. The wireless exciter/receiver nodes may be designed to transmit data not obtained from SAW devices 100 as well.

Where SAW devices 100 are found in multiple locations in a valve actuator 20, torque data may be uniquely identified by location. Similarly, where multiple valve actuators 20 or valves are externally wirelessly excited, torque data may be uniquely associated with a particular valve actuator 20 and/or locations within the actuator. Unique identification may be accomplished in a number of ways.

In a particular embodiment, the signal transmitted by a SAW device 100 may be unique. Therefore, two SAW devices 100 experiencing the same strain would transmit different outputs. In one embodiment, different SAW devices 100 could utilize different input frequencies. The input frequencies could be sufficiently different so that, regardless of any strain experienced, the output frequency range of each SAW device 100 would not overlap. In a second embodiment, reflectors may be placed in piezoelectric substrate 130 to modify the output frequency. Each SAW device 100 may have a unique set of reflectors. The reflectors may be placed such that torque data may be obtained and then determine which particular SAW device 100 is transmitting.

In another particular embodiment, any electronics associated with a SAW device 100 may provide unique identification of a SAW device 100 or group of SAW devices 100 at one location. In one embodiment, an amplifier for each SAW 100 device may provide a unique level of amplification, thereby distinguishing the SAW device 100. In a second embodiment, a unique converter may be associated with each SAW device 100. The unique converter could alter the signal type produced by an output electrode 120. Therefore, the new unique signal type could identify the source SAW device 100. In a third embodiment, a unique wireless tag can be added to the output produced by output electrode 120 to uniquely identify the source.

In yet another embodiment, a wireless exciter/receiver may be used to uniquely identify a SAW device 100. In one variation of the invention, only one valve actuator 20 at a time may be subjected to transmission from the wireless exciter/receiver. For example, a PDA having only a low-power exciter could be directed at a specific valve actuator 20. In a second embodiment, the intensity of transmission from a SAW device 100 may be used to identify its location. For example, assuming all of the amplifiers are equal, the distance from a SAW device 100 to a wireless exciter/receiver will determine the strength or intensity of the signal received by the wireless exciter/receiver. The intensity of each signal may be measured. If each of the SAW devices 100 is at sufficiently different distances from the wireless exciter/receiver, then the different intensities of signals may be used to identify the sources. Any other means in the art for identifying the source of radio frequencies may be used.

SAW devices 100 may be utilized for generating torque, thrust, strain, temperature, pressure, speed, position, and other data.

Embodiments have been described using a SAW device. It should be understood that any non-contact sensing may be used in place of the SAW device. For example, other embodiments of a non-contact sensor may use magnetoelasticity, magnetostriction, stress wires, "guitar string" elements, strain gauges, acoustics, light, optics, capacitance, inductance, resistance, reluctance, radio telemetry, strain members, charge coupled devices, or micromachining to make a non-contact determination of the torque of a rotating component.

In one embodiment of a non-contact torque sensor, strain gauges attached to a rotary component may be powered by a battery attached to the rotary component and the output of the strain gauges (or an equivalent) wirelessly transmitted.

One embodiment of a non-contact optical sensor utilizes two optical sensors placed in line on a rotary component relative the rotational axis of the component. As the rotary component twists under torque, the two optical sensors will no longer be in line. The displacement between the two sensors may be used to determine the torque experienced.

A non-contact sensor may be passive and not require a battery or some other external power source. In other embodiments, the non-contact sensor may be active and require an external power source.

Although the foregoing description contains many specifics, these are not to be construed as limiting the scope of the present invention, but merely as providing certain representative embodiments. Similarly, other embodiments of the invention can be devised which do not depart from the spirit or scope of the present invention.

What is claimed is:

1. An electrically driven valve actuator, comprising:
    a rotating member; and
    a sensor comprising at least one surface acoustic wave device, the at least one surface acoustic wave device attached to the rotating member, wherein the at least one surface acoustic wave device outputs a uniquely identifiable signal to a wireless receiver, wherein the surface acoustic wave device is configured to measure one or more of a torque and an axial thrust associated with the rotating member.

2. The valve actuator of claim 1, wherein the at least one surface acoustic wave device operates at a frequency range of about 3 megahertz to about 3 gigahertz.

3. The valve actuator of claim 1, wherein the at least one surface acoustic wave device comprises two surface acoustic wave devices placed at opposing angles to each other on the rotating member.

4. The valve actuator of claim 1, wherein the at least one surface acoustic wave device measures axial thrust.

5. The valve actuator of claim 1, wherein the at least one surface acoustic wave device measures torque.

6. The valve actuator of claim 1, wherein the rotating member is selected from the group consisting of a worm shaft, motor drive shaft, drive sleeve, handwheel adapter, teeth of worm gear, declutch mechanism, declutch handle, and input shaft for an encoder.

7. The valve actuator of claim 1, wherein the rotating member is a valve stem.

8. The valve actuator of claim 1, wherein the sensor comprises a plurality of surface acoustic wave devices and wherein each surface acoustic wave device of the plurality of surface acoustic wave devices outputs a uniquely identifiable signal to a wireless receiver.

9. The valve actuator of claim 1, wherein the rotating member is a linear moving valve stem.

10. The valve actuator of claim 1, wherein the at least one surface acoustic wave device comprises a first surface acoustic wave device that outputs a uniquely identifiable wireless signal within a first frequency range and a second surface acoustic wave device that outputs a uniquely identifiable wireless signal within a second frequency range wherein the second frequency range does not overlap the first frequency range.

11. The valve actuator of claim 1, further comprising a display that indicates output values associated with the at least one surface acoustic wave device.

12. The valve actuator of claim 11, further comprising electronics comprising an amplifier for each surface acoustic wave device, a converter associated with each surface acoustic wave device, or a wireless tag associated with an output produced by an output electrode.

\* \* \* \* \*